(12) United States Patent
Pöhmerer et al.

(10) Patent No.: US 7,500,354 B2
(45) Date of Patent: Mar. 10, 2009

(54) METHOD FOR OPERATING AN INTERNAL COMBUSTION ENGINE THAT IS EQUIPPED WITH A THREE-WAY CATALYTIC CONVERTER

(75) Inventors: Wolf-Dieter Pöhmerer, Colomiers (FR); Gerd Rösel, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 402 days.

(21) Appl. No.: 10/513,509

(22) PCT Filed: May 2, 2003

(86) PCT No.: PCT/DE03/01407

§ 371 (c)(1),
(2), (4) Date: Nov. 5, 2004

(87) PCT Pub. No.: WO03/095817

PCT Pub. Date: Nov. 20, 2003

(65) Prior Publication Data

US 2005/0166578 A1 Aug. 4, 2005

(30) Foreign Application Priority Data

May 7, 2002 (DE) ................................ 102 20 337

(51) Int. Cl.
*F01N 3/00* (2006.01)
(52) U.S. Cl. .......................................... 60/285; 60/274
(58) Field of Classification Search ............... 60/274, 60/276, 285, 299, 277
See application file for complete search history.

(56) References Cited

U.S. PATENT DOCUMENTS 5,678,402 A 10/1997 Kitagawa et al.
5,842,340 A * 12/1998 Bush et al. ..................... 60/274
5,901,552 A * 5/1999 Schnaibel et al. .............. 60/274
5,974,788 A * 11/1999 Hepburn et al. ................ 60/274

FOREIGN PATENT DOCUMENTS

DE 44 42 734 6/1995

(Continued)

OTHER PUBLICATIONS

C.C. Webb et al., "Effect of Phased Air/Fuel Ratio Perturbation and Catalyst O2 Storage Capability on Catalyst Conversion Efficiency," SAE Technical Paper Series, No. 2000-01-2924, Oct. 16, 2000.

(Continued)

*Primary Examiner*—Thomas E Denion
*Assistant Examiner*—Diem Tran
(74) *Attorney, Agent, or Firm*—Laurence A. Greenberg; Werner H. Stemer; Ralph E. Locher

(57) ABSTRACT

The invention relates to a method for operating an internal combustion engine that is equipped with a three-way catalytic converter. According to the inventive method, a lambda value of the air/fuel mixture, with which the internal combustion engine is supplied, is set below and above a set value in a cyclically alternating manner during a forced activation whereby the lambda value in rich phases is less than the set value and in lean phases, is greater than the set value. During the forced activation, the rich phases and the lean phases are matched to one another according to a specified criterion. The invention provides that the amount, by which the lambda value in rich phases is set below the set value, is selected so that it is equal to the amount, by which the lambda value in lean phases is set above the set value. When determining the criterion, an air mass is used that is supplied to the internal combustion engine during the rich and lean phases.

9 Claims, 3 Drawing Sheets

FOREIGN PATENT DOCUMENTS

| | | |
|---|---|---|
| DE | 195 11 548 | 6/1996 |
| DE | 198 01 815 | 7/1999 |
| DE | 199 53 601 | 5/2001 |
| DE | 100 35 238 | 1/2002 |
| EP | 1 167 726 | 1/2002 |
| EP | 1 180 590 | 2/2002 |

OTHER PUBLICATIONS

K. Miyamoto et al., "Measurement of Oxygen Storage Capacity of Three-Way Catalyst And Optimization Of A/F Perturbation Control To Its Characteristics," SAE Technical Paper Series, No. 2002-01-1094, Mar. 4, 2002.

* cited by examiner

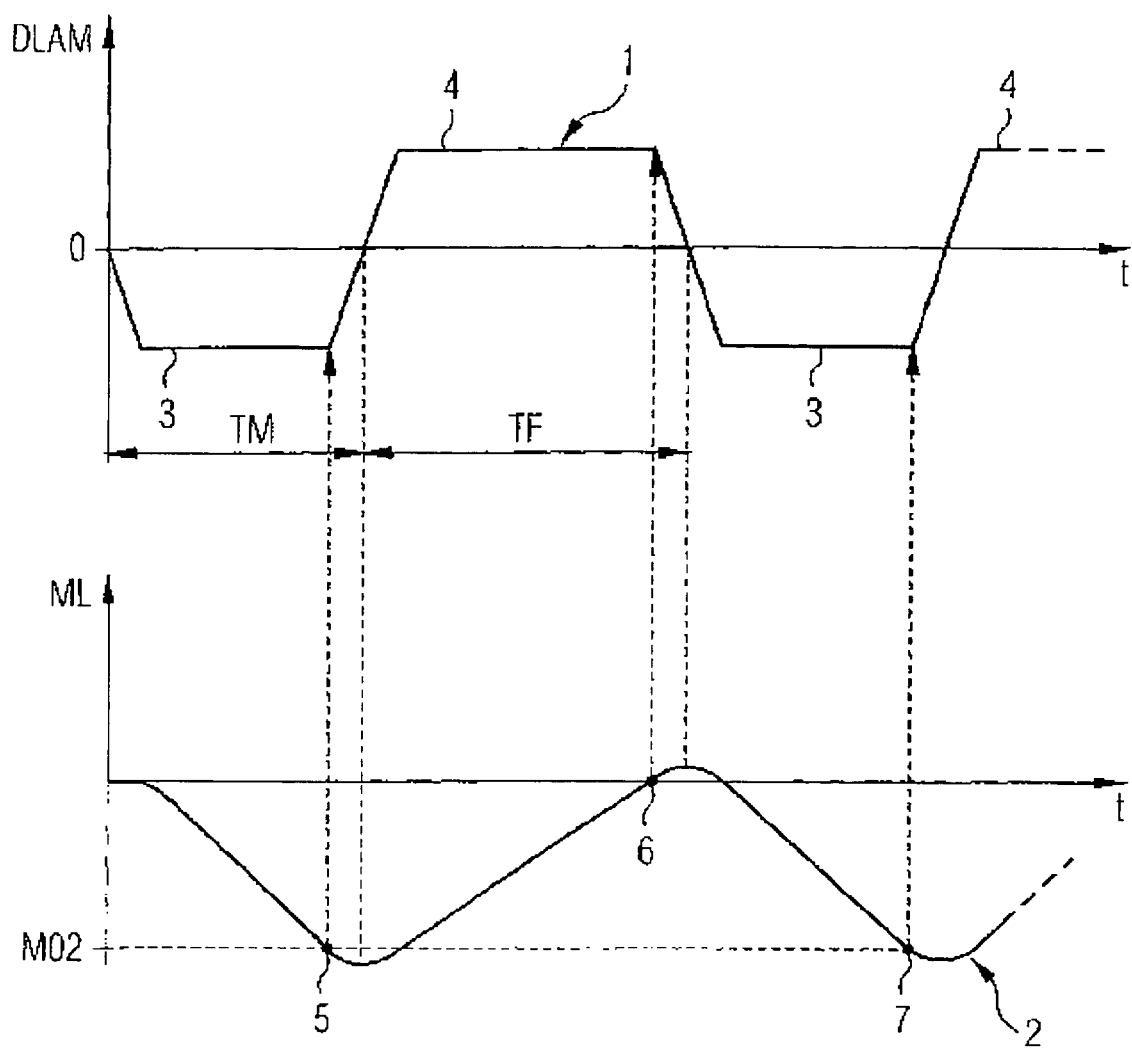

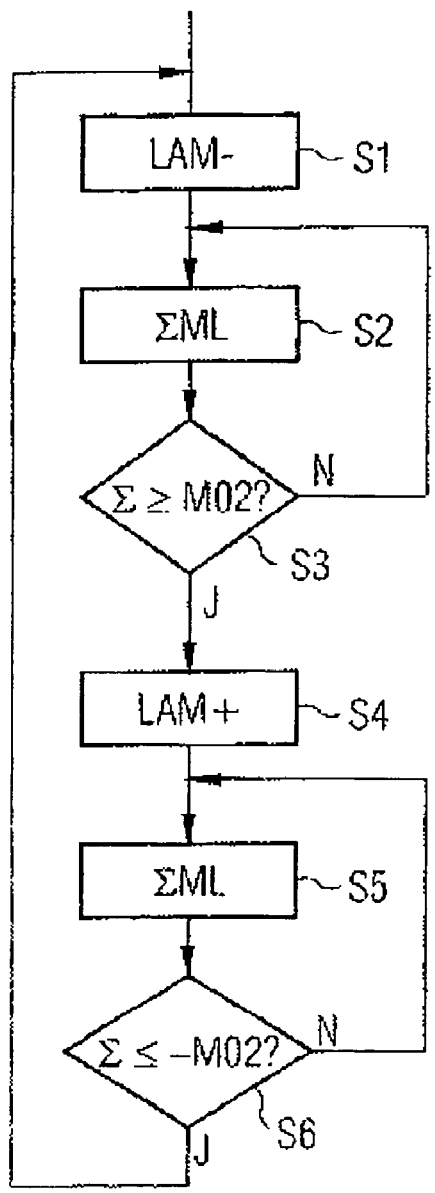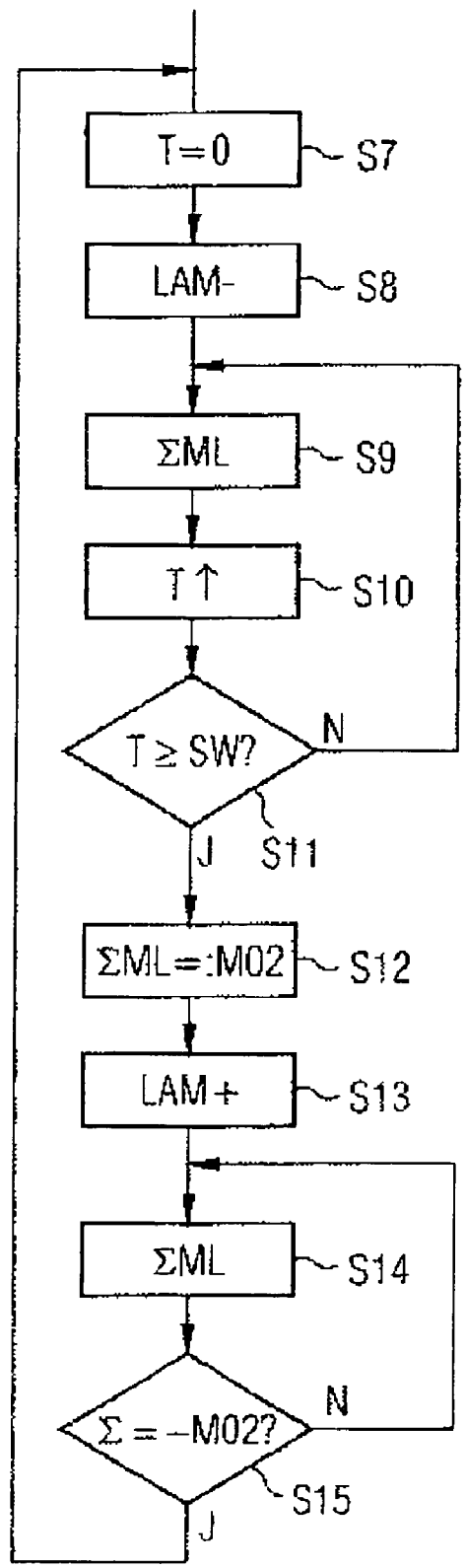

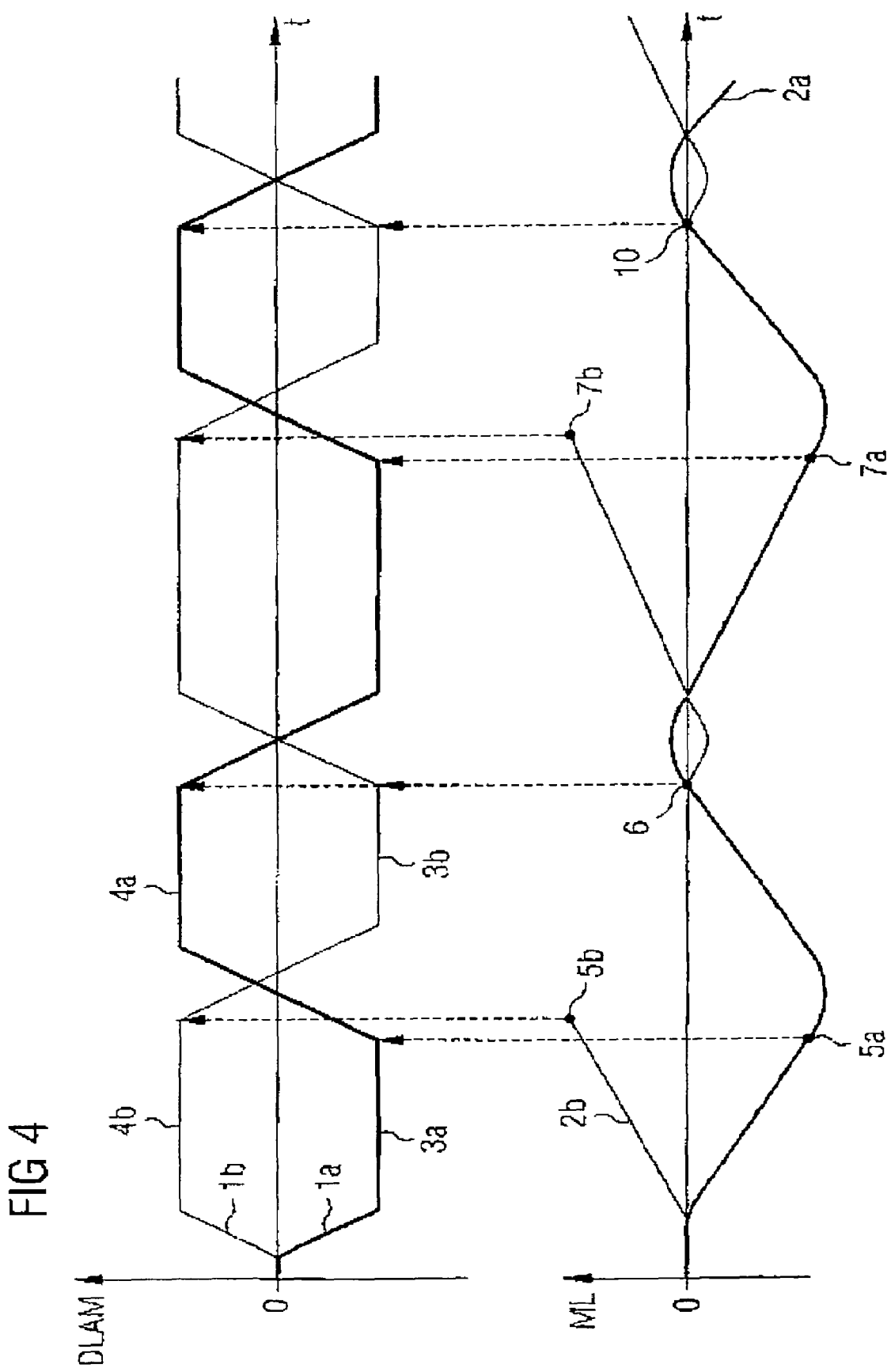

METHOD FOR OPERATING AN INTERNAL COMBUSTION ENGINE THAT IS EQUIPPED WITH A THREE-WAY CATALYTIC CONVERTER

CLAIM FOR PRIORITY

This application is a national stage of PCT/DE03/01407, published in the German language on Nov. 20, 2003, which claims the benefit of priority to German Application No. DE 102 20 337.7, filed on May 7, 2002.

TECHNICAL FIELD OF THE INVENTION

The invention relates to a method for operating an internal combustion engine equipped with a three-way catalytic converter.

BACKGROUND OF THE INVENTION

Conventional methods, such as those disclosed in DE 195 11 548 A1, DE 198 01 815 A1 or DE 199 53 601 A1, with the last-mentioned document also disclosing evaluation of a catalytic converter as regards ageing by evaluating the air mass value of the combustion air that is sucked in by the internal combustion engine.

In the case of internal combustion engines, emitted exhaust gases can be given an aftertreatment in the exhaust gas duct by using a three-way catalytic converter that oxidizes or reduces harmful substances of the exhaust gas to innocuous compounds. However, it is also known that such internal combustion engines equipped with a three-way catalytic converter for achieving a high degree of efficiency must be supplied with an average stoichiometric air/fuel mixture; in such a lambda regulation, the oxygen contents of the exhaust gas is measured by means of so-called lambda probes and the air/fuel mixture is regulated to an average value close to lambda=1 because three-way catalytic converters only function in a tight range around lambda 1 as requested. This range is also designated as the catalytic converter window.

In order to increase the degree of efficiency of a three-way catalytic converter, the air/fuel mixture is designed in such a way that in the forced activation acting on the lambda regulation as anticipatory control around the stoichiometric set value, default values are set alternately with an over-stoichiometric and under-stoichiometric mixture in cycles. Because of the forced activation, the default value for the lambda value in rich phases is lower than the stoichiometric set value and in lean phases is greater than the set value.

Alternately, supplying oxygen to and extracting oxygen from the three-way catalytic converter results in suitable oxygen ratios for the oxidation and reduction phases.

Because the reducing or oxidizing effect of a three-way catalytic converter decreases tremendously in the case of values set below or above a set value for the stoichiometric mixture, care must be taken that in the forced activation within the average time, an air/fuel mixture is always used in the catalytic converter window.

Therefore, in the prior art in lean and rich phases of the forced activation, a default value deviating by the same amount from the stoichiometric set value is set in each case and the phases are equal in length. Lambda deviations from the default value possibly determined by interference are balanced out by a lambda regulator.

SUMMARY OF THE INVENTION

The invention relates to a method for operating an internal combustion engine equipped with a three-way catalytic converter in the case of which a lambda value of the air/fuel mixture, with which the internal combustion engine is supplied, is set below and above a stoichiometric set value in a cyclically alternating manner during a forced activation, whereby the lambda value in rich phases is less than the stoichiometric set value and in lean phases is according to the stoichiometric set value, in the case of which during the forced activation, the rich phases and the lean phases are matched to one another according to a specified criterion.

The invention discloses a method of the above-mentioned type in such a way that the forced activation brings about a higher degree of efficiency of a three-way catalytic converter.

The invention discloses a generic method in that for the criterion according to which the phases are matched, the air mass is used that is supplied to the internal combustion engine as combustion air in rich and lean phases.

The invention is based on the knowledge that it is important for the efficiency of a three-way catalytic converter to remove again during the rich phase the amount of oxygen stored in a lean phase. Because the amount of oxygen by means of which a three-way catalytic converter is filled in the lean phase and which is removed in the subsequent rich phase depends on the amount of air that is fed into the internal combustion engine as combustion air, the basic approach according to the invention directly depends on the actual parameters influencing the filling and removal process. In addition, influences that have an air mass flow that change during the filling and emptying process, no longer have an interfering effect because they are taken into consideration when determining the criterion. Therefore, the invention replaces the previously time-based forced activation in the linear lambda regulation with an air mass flow-based forced activation and as a result again achieves a high degree of efficiency of the three-way catalytic converter because the catalytic converter window is set in a more stable manner.

The invention has the further advantage that in rich and lean phases, deviations from the stoichiometric set value can be selected freely and in particular can differ.

Therefore, if the load or the rotational speed of an internal combustion engine changes, the air mass supplied within a unit of time also changes and therefore also the amount of oxygen fed into or extracted from a three-way catalytic converter within a unit of time. Whereas a purely time-based forced activation has to correct resulting errors via a guide regulator also to be provided for the lambda regulation, the air mass flow-based forced activation automatically takes care of a corresponding balancing, since the lean or rich phases are shortened or lengthened in a corresponding way. As a result, the method according to the invention makes the lambda regulation more precise because an error is not only eliminated afterwards, but avoided from the start.

Of importance for the air mass flow-based forced activation is the fact that in lean and rich phases, the same amount of oxygen is fed into or removed from the catalytic converter. In principle, a set amount can then be specified for this. Alternatively, this set amount can be managed dynamically, i.e. a rich phase or a lean phase are ended if they are matched to the immediately preceding lean and rich phase according to the criterion.

In the case of the air mass flow-based forced activation, the air mass is used as a criterion for the oxygen mass relevant to a filling or removal process of a three-way catalytic converter. In a preferred further development, a direct volume for the oxygen mass that is emitted in the lean and rich phases in the exhaust gas by the internal combustion engine can be used as the criterion. For this purpose, the oxygen load during the lean phase can be calculated as follows by summation or integration of the air mass flow:

$$MO2 = 0.23 \cdot \int_{i=0}^{i=TM} \left(1 - \frac{1}{LAM}\right) \cdot M \dot{L} dt.$$

This formula gives the oxygen mass MO2 as a function of the absolute lambda value LAM, the flow of the air mass ML and time TM that it takes a lean phase. If instead of the absolute lambda value LAM, the deviation DLAM from a set value 1 assumed for the catalytic converter window is used, the formula is as follows:

$$MO2 = 0.23 \cdot \int_{i=0}^{i=TM} \left(1 - \frac{1}{DLAM}\right) \cdot M \dot{L} dt.$$

Therefore, the deviation is the difference between the default value of the forced activation and the stoichiometric set value that is adhered to on average. The above-mentioned relationship also applies to the rich phase in which oxygen is extracted, however DLAM is then negative.

As can be seen, the concept according to the invention avoids a further error which inherently underlies the purely time-based basic approach: it assumes that the oxygen mass supplied to the lean operating phases is the same as that removed in the rich phases from the catalytic converter. However, this is not the case because also in the case of deviations from the same amount, DLAM of the fraction of the integral between brackets is smaller for lean operating phases than for rich operating phases.

The forced activation according to the invention is not based on this assumption and instead balances the rich and lean phases—and does this independently of the selection for DLAM and of the air mass flow. The integrated air mass, the average air mass or also the oxygen mass calculated according to the above-mentioned formula can be, for example, the criterion for the oxygen mass. Here the accuracy requirement and the costs can be balanced.

A particularly accurate regulation of forced activation and at the same time relatively low costs can be achieved at the same time if, as criterion, an integral is used over the air mass supplied during the rich or lean phase. In addition, the amount by which the default value in rich phases is set below the stoichiometric set value is selected so that it is equal to the amount by which the default value in lean phases is set above the stoichiometric set value. However, this does not have to be the case. The integral can be executed easily and automatically takes different values in the rich and lean phases into consideration.

When adapting a controller to an internal combustion engine type, different parameters are usually set, i.e. applied. Therefore, the oxygen mass can be set in the case of the air mass flow-based forced activation. However, in order to be able to achieve the highest possible parallelism to previous forced activation systems, it is advantageous to apply a time duration as before. For this application, preference should be given to a further development of the invention in the case of which in each cycle the rich or the lean phase is executed for a specific time thus determining the air mass, and during the subsequent lean or rich phase, the air mass is integrated and the phase ends if the air masses are the same.

Therefore, the time provided together with the previous forced activation concepts no longer gives both the duration of the lean phase and the rich phase, but only defines (indirectly) the oxygen mass that is relevant to the lean or rich phase. The directly subsequent rich or lean phase is then regulated on the basis of the oxygen mass supplied or extracted in the specified time.

Therefore, a first phase (it can be both a lean and a rich phase) that is executed for a specific time is defined, and which in terms of value, defines the criterion for the composition of the second subsequent phase (in the same way as the rich or lean phase) via the relevant amount of oxygen or the air mass.

The parallelism to the values used in conventional forced activation concepts can be increased further if at the start of a first phase (for example, a rich phase), the current air mass flow from which the internal combustion engine receives its combustion air is determined and a time is established for which the first phase has to last for this period in the case of this air mass flow in order to achieve a predetermined oxygen mass. Therefore, in the forced activation, the first phase is then carried out precisely for this time and indeed independently from how the air mass flow changes. However, the air mass or the oxygen mass during the first phase is detected. The second phase is developed in such a way that the same air mass or oxygen mass is obtained.

This embodiment of the method provides an air mass or the oxygen mass as the target value, but which is made available in the form of a time for the default value of the first phase whereby the highest possible parallelism to previous forced activation concepts applies with regard to the application of parameters.

The basic approach according to the invention, as is also expressed in this further development, makes it possible to precisely match the amounts of oxygen removed or fed into the three-way catalytic converter to each another, i.e. the following equation applies:

$$\int_{i=0}^{i=TM} \left(1 - \frac{1}{DLAM}\right) \cdot MLdt = \int_{i=0}^{i=TF} \left(1 - \frac{1}{DLAM}\right) \cdot \dot{M} Ldt$$

The basic approach according to the invention makes it possible that a uniformity is achieved by the specific composition of the lean phase duration TM as well as the rich phase duration TF. Then, as has already been mentioned, it is also taken into account that in lean phases the difference DLAM between the default value and the stoichiometric average is positive, but is negative in rich phases in the case of which the expression between brackets in lean phases is less than in rich phases. Over and above that, the default value can now be selected freely in the lean or rich phases and DLAM in particular need no longer be equal to the amount for the two phases.

The concept according to the invention can be used to particular advantage in the case of multi-cylinder internal combustion engines with two independent cylinder groups that can be supplied with an air/fuel mixture. In order to prevent the independent lambda-regulated cylinder groups drifting apart, it is worthwhile in the case of the concept according to the invention for there to be a forced synchronization between the two groups, for which reason in a preferred further development of the invention care is taken that on ending each second phase (lean or rich phase) of a cylinder group, the corresponding phase of the other cylinder groups also ends automatically or that a predetermined phase shift is adhered to.

Therefore, in the case of a multi-cylinder internal combustion engine with two independent cylinder groups which can be supplied with an air/fuel mixture, a method is preferred which determines a criterion for a cylinder group and is used by default. Therefore, with regard to the forced activation a cylinder group is operated as a master group and the other one follows as a so-called slave group. Therefore, the default by the master group can take place in many different ways as has already been mentioned above. However, it is of considerable importance that at specific times a forced synchronization takes place. For this, an air mass set value, a set value for the average air mass, a set value for the oxygen mass, etc. can be specified.

In a further development that is very easy to execute as far as control is concerned, in which the application for a multi-cylinder internal combustion engine is linked to a further development that can be applied by a period of time, there is provision, in the rich or lean phase for a cylinder group to be determined as the criterion and used as default. Therefore, a rich phase of a cylinder group is carried out time-regulated and at the same time the supplied air and oxygen mass is detected. The rich phase of the other cylinder group is then developed according to this air mass or oxygen mass value. Likewise, the lean phases of both cylinder groups; in this case care must be taken that the deviation from the stoichiometric set value in rich phases is not less than in the lean phases.

BRIEF DESCRIPTION OF THE DRAWINGS

The invention is explained in greater detail on the basis of the accompanying drawings. They are as follows:

FIG. 1 time sequences of the lambda change and the air mass in the case of an air mass-based forced activation.

FIG. 2 a flow diagram for carrying out an air mass-based forced activation.

FIG. 3 a further embodiment of a method for the air mass-based forced activation in the case of which a time value for the application on an internal combustion engine type can be set.

FIG. 4 time sequences of the lambda change and the air mass in the case of an air mass-based forced activation for an internal combustion engine with two cylinder groups which can be supplied independently with an air/fuel mixture.

DETAILED DESCRIPTION OF THE INVENTION

For an internal combustion engine in the case of which a three-way catalytic converter is arranged in the exhaust gas duct and runs under a linear lambda regulation, in a forced activation a default value is set around a stoichiometric lambda set value as the anticipatory control for the lambda regulation. In this case, a shift of the mixture alternately to the lean and the rich is given.

In the lean shift, the three-way catalytic converter, that has oxygen storage properties, is filled with oxygen whereas it is emptied again in the rich shift. This filling and emptying process depends on the difference between the default value and the stoichiometric set value in the phases, i.e. on the amplitude of the forced activation as well as the duration of the shift.

The amount of oxygen by means of which the three-way catalytic converter is filled and extracted depends on the amount of air that is fed into the internal combustion engine during combustion. The oxygen mass fed into a lean phase takes place according to the following equation:

$$MO2 = 0.23 \cdot \int_{i=0}^{i=TM} \left(1 - \frac{1}{LAM}\right) \cdot M\dot{L} dt.$$

in which case ML represents the air mass and DLAM the lambda change, i.e. the amplitude of the forced activation. This equation is also designated as the oxygen mass integral.

In order to now ensure that the filled or emptied amount of oxygen in lean and rich phases of the forced activation is equal, the integral is calculated in each case. In this case, the lean phase is executed in such a way that a specific oxygen mass value MO2 is set. The directly subsequent rich phase is also developed in such a way that precisely this oxygen mass value MO2 is achieved.

FIG. 1 shows a lambda curve 1 as a time sequence in which case the lambda change DLAM is plotted over time t. The lambda change DLAM is then possibly approximated to a quadrilateral function during the operation of an internal combustion engine so that in the half cycles 3 and 4, a constant lambda change DLAM is given in each case.

Therefore, the transitions between the half cycles 3 and 4 correspond to a linear change, the slope of which is selected in such a way that in this case there is no loss of comfort during the operation of an internal combustion engine.

The lambda value DLAM in each half cycle 3 and 4 is used to calculate the oxygen mass by means of the above-mentioned integral. Therefore, the lean phase duration TM is the time between two zero passages of the lambda curve 1. As a result, an oxygen mass curve 2 drawn in on FIG. 1 in which the air mass ML is recorded over time t is obtained. As can be seen, the oxygen mass integral curve 2 also runs cyclically and is synchronous to the lambda curve 1. At the end of the lean phase duration TM the oxygen mass integral curve 2 has a local minimum.

The end of a lean phase and thereby the end of a half cycle 3 is determined on the basis of the oxygen mass integral curve 2. If the value of the oxygen mass integral is lower than a value MO2, a switching point 5 is determined in the case of which the lean phase ends, i.e. the lambda change DLAM that was constant up to now then changes to zero with the above-mentioned slope and then changes to the opposite value for the lean phase. For the zero passages the lean phase duration TM then ends and the rich phase duration TF then follows. From this zero passage, the value of the oxygen mass integral again increases. If it reaches zero then an additional switching point 6 is achieved for which the end of the rich phase duration begins and the lambda change DLAM is again set to the value for the next lean phase with the above-mentioned slope.

As can clearly be seen from the lambda curve 1 in FIG. 1, this concept results in the fact that the default value in the forced activation is selected and that there are different durations for the lean and rich phases. They are in each case developed until exactly the same value MO2 is achieved so that a continuous supply in the average stoichiometric mixture is ensured.

This method for the forced activation is shown diagrammatically in FIG. 2 which assumes that a rich phase was used as the start. First of all, in a step S1 the internal combustion engine is operated with a slightly rich mixture, i.e. the lambda value LAM is lowered; this can be seen diagrammatically in step S1 by a minus sign.

Subsequently, the oxygen mass integral is calculated in a step S2. This can be the above-mentioned integral. However, if the lambda value can be kept constant it need not be taken into consideration and an integral or sum formation via the air mass flow alone is sufficient.

Subsequently, a test is performed in a step S3 to determine whether or not the achieved sum is above a value MO2. Should this not be the case ("N"-branch) it would be necessary to return to step S2, i.e. the rich phase is continued.

However, if the value MO2 is achieved on the other hand ("J"-branch), the default value is now raised in a step S4 which brings about a leaner mixture, i.e. a lean lambda value LAM is specified. In step S4 this can be seen by means of a plus sign.

During the resulting lean phase, the oxygen mass integral is again determined on the one hand or the air mass is summed up or integrated. This takes place in a step S5.

Subsequently, step S6 requests whether or not this summation again reached the value MO2. If this is not the case ("N"-branch) the lean phase is continued, i.e. step S5 is once again carried out. However, if on the other hand the oxygen mass value MO2 is achieved ("J"-branch) it would be necessary to return to before step S1, i.e. a rich phase once again follows.

Therefore, in terms of the concept shown diagrammatically in FIG. 2, the lean phases and the rich phases are matched to a same value MO2 in each case. It will be possible to select this value depending on the properties of the three-way catalytic converter and can particularly also be increased or decreased for diagnostic purposes deviating from normal operation for the short-term, for example, in order to check the behavior of the three-way catalytic converter.

FIG. 3 diagrammatically shows an alternative embodiment of the method. In this case, in a step S7 a cycle period T is first of all initialized, i.e. set to zero. Subsequently in a step S8 a rich phase to reduce the lambda value LAM is carried out. In step S9, an oxygen mass integral calculation or the summation or integration of the air mass then follows in the same way as in step S2.

Next in a step. S10, the cycle time T is raised, i.e. increased by one time increment. A request in a step S11 checks whether or not the current cycle time t exceeds a threshold value SW. If this is not the case ("N"-branch) the rich phase is continued, i.e. step S9 is continued. If, on the other hand, the cycle duration has exceeded a predetermined threshold value SW2 ("J-branch"), the value of the sum or the integral is stored in a step S12 via the air mass as an oxygen mass value MO2. It then serves to regulate the subsequent lean phase. Subsequently, the steps S13, S14 and S15 that conform to the steps S4 to S6 are carried out.

The air mass-based criterion for matching the rich and the lean phases in the forced activation can also for example be used for internal combustion engines that have several two cylinder groups—the air/fuel mixture of which can be set independently from one another. This is usually the case for internal combustion engines with several cylinder supports, for example, in the case of V6 or V8 configurations.

FIG. 4 shows lambda curves 1a and 1b as well as the oxygen mass integral curves 2a and 2b for a forced activation in the case of such systems.

There is also provision in this case, at certain times, for forced synchronizations between the two cylinder groups to be carried out so that there is no drifting apart of the two groups with regard to the forced activation. Such a drifting apart would be supported by numerical inaccuracies. The lambda curves 1a and 1b shown in FIG. 4 provide a forced synchronization at the end of the lean phase of a bank of cylinders.

In the case of the forced activation, a bank of cylinders is operated as a so-called master, i.e. it supplies the default values with regard to the air mass-based balancing criterion to the other bank that runs as a slave. The lambda curve of the master-operated bank is provided with a reference symbol 1a in FIG. 4 and is also drawn in with a thicker line intensity in the same way as the associated oxygen mass integral curve 2a.

The half cycles 3a and 4a of the lean or rich phases of the cylinder bank operated as master correspond to those of FIG. 1 so that these descriptions can be referred to concerning this matter.

If a switching point 5a is reached, the end of the half cycle 3a is implemented and a half cycle 4a follows, the end of which is initiated in the switching point 6. The half cycles 3b and 4b of the cylinder group operated as slave orientate themselves to the oxygen mass values MO2 that were reached default-specifically in the case of switching points 5a or 6. As can be seen from the oxygen mass integral curve 2b for the slave cylinder bank that is operated with a push-pull operation to the master cylinder group in the forced activation, the switching point 5b is reached in time after the switching point, i.e. the half cycle 3b takes longer than the half cycle 3a. The reason for this being the value of the expression in brackets which depends on the indicator DLAM in the above-mentioned oxygen mass integral, shifts in equal amounts DLAM in rich and lean phases.

Therefore, for this reason the half cycle 4a is also longer than the half cycle 4b. In the oxygen mass integral curve 2b it stands out that during the half cycle 4b, there is no integration. This is due to the fact that on reaching the switching point 6 that is defined by the oxygen mass integral curve 2a for the master cylinder group there is a forced synchronization of the half cycles 4a and 3b, so that it is ensured that the push-pull operation or the specified phase shift between the forced activation of the master cylinder group and the slave cylinder group is retained. However, for the case that a cylinder group can be switched off, the integration should be carried on so that the slave support can then be used as the master bank for the short term.

The additional lambda curve 1a and 1b as well as the oxygen mass integral curve 2a and 2b clearly shows the influence of the oxygen mass integral on the duration of the rich and lean phases and with that also the period of the forced activation. There, the oxygen mass integral curve 2a and 2b proceeds with a clearly lower slope, i.e. the internal combustion engine clearly sucks in a smaller air mass flow than before. Therefore, the half cycles 4b and 3a are extended accordingly.

Balancing by means of an air mass-based criterion not only brings about that lean and rich phases in each case are the same under the degree of efficiency viewpoints, but an optimum oxygen mass that is fed into or extracted from the three-way catalytic converter can also be set.

The invention claimed is:

1. A method for operating an internal combustion engine equipped with a three-way catalytic converter, comprising:
setting a lambda value of the air/fuel mixture, with which the internal combustion engine is supplied, below and above a stoichiometric set value in a cyclically alternating manner during a forced activation, the lambda value in rich phases being less than the stoichiometric set value and in lean phases being greater than the stoichiometric set values; and matching during the forced activation, the rich phases and the lean phases to one another according to a specified criterion, wherein based on an air mass flow that is supplied to the internal combustion engine in the rich and lean phase, a volume is determined for an oxygen mass relevant to a filling or emptying process of a three-way catalytic converter and used as a criterion to determine the switching points between the rich and the lean phases, and wherein the amount by which the lambda value in rich phases is set below the set value is selected so that it is equal to the amount by which the lambda value in lean phases is set above the set value.

2. The method according to claim 1, wherein as criterion, an integral is used over the air mass supplied during the rich or lean phase and in each cycle the rich or the lean phase is carried out for a specific time thus determining the air mass, and during the subsequent lean or rich phase, the air mass is integrated and the phase ends if the air masses are the same.

3. A method for operating an internal combustion engine equipped with a three-way catalytic converter, comprising:

setting a lambda value of the air/fuel mixture, with which the internal combustion engine is supplied, below and above a stoichiometric set value in a cyclically alternating manner during a forced activation, the lambda value in rich phases being less than the stoichiometric set value and in lean phases being greater than the stoichiometric set values; and matching during the forced activation, the rich phases and the lean phases to one another according to a specified criterion, wherein based on an air mass flow that is supplied to the internal combustion engine in the rich and lean phase, a volume is determined for an oxygen mass relevant to a filling or emptying process of a three-way catalytic converter and used as a criterion to determine the switching points between the rich and the lean phases; and wherein in a multi-cylinder internal combustion engine with two independent cylinder groups that can be supplied with an air/fuel mixture, the criterion determined for one cylinder group is used as default for the other cylinder group.

4. The method according to claim 3, wherein in the rich or lean phase of a cylinder group, the criterion is determined as default.

5. A method for operating an internal combustion engine equipped with a three-way catalytic converter, comprising:

setting a lambda value of an air/fuel mixture, with which an internal combustion engine is supplied, below and above a stoichiometric set value in a cyclically alternating manner during a forced activation, the lambda value in rich phases being less than the stoichiometric set value and in lean phases being greater than the stoichiometric set values;

in the lean phases, measuring a first air mass flow and dependent on the first air mass flow, calculating a first parameter indicating an amount of oxygen being stored in a three-way catalytic converter;

in the rich phases, measuring a second air mass flow and dependent on the second air mass flow, calculating a second parameter indicating an amount of oxygen being removed from the three-way catalytic converter; and using the first parameter and the second parameter to determine the switching points between the rich phases and the lean phases and to match the rich phases and the lean phases to each other.

6. The method according to claim 5, which further comprises ending a rich phase if an amount of oxygen being removed in the rich phase substantially equals an amount of oxygen that was stored in an immediately preceding lean phase.

7. The method according to claim 5, which further comprises ending a lean phase if an amount of oxygen being stored in the lean phase substantially equals an amount of oxygen that was removed in an immediately preceding rich phase.

8. The method according to claim 5, wherein the first air mass flow and the second air mass flow are flows that are supplied to the internal combustion engine.

9. The method according to claim 5, wherein the first air mass flow and the second air mass flow are exhaust gas flows that are emitted by the internal combustion engine.

* * * * *